United States Patent [19]
Jachim

[11] 3,775,895
[45] Dec. 4, 1973

[54] CONTAINER FOR FISH LURES

[76] Inventor: Frank J. Jachim, 1312 Summer St., Hammond, Ind. 46320

[22] Filed: Sept. 26, 1972

[21] Appl. No.: 292,430

[52] U.S. Cl............................................. 43/54.5 R
[51] Int. Cl........................................... A01k 97/04
[58] Field of Search..................... 43/57.5 R, 54.5 R

[56] References Cited
UNITED STATES PATENTS
2,849,829  9/1958  Fisher et al. ...................... 43/57.5 R
2,220,817  11/1940  Holmes........................... 43/57.5 R
2,854,783  10/1958  Armand........................... 43/57.5 R
2,316,833  4/1943  Baron.............................. 43/57.5 R

*Primary Examiner*—Louis G. Mancene
*Assistant Examiner*—Daniel J. Leach
*Attorney*—Leonard F. Weklind

[57] ABSTRACT

A holder for fish lures in the form of a box having supports for hooking over the gunwale of a boat and having a notched bar extending across the box near the top to receive the hooks on the lures so they may hang within the box, the hooks being engaged by a movable clamping member that in operative position holds the hooks in the notches.

2 Claims, 2 Drawing Figures

PATENTED DEC 4 1973 3,775,895

CONTAINER FOR FISH LURES

BACKGROUND OF THE INVENTION

One of the problems in keeping a plurality of lures ready for use is that they readily become entangled one with another and are not in a convenient position for selection of a particular lure after the container has been carried from home to the boat from which the fishing is to be done. It is desirable to have these lures carefully separated one from another and in such a position that they will all be readily seen and any one lure may be easily selected.

STATEMENT OF THE INVENTION

One feature of the invention is a holder for the lures in the form of a box having a notched supporting means extending horizontally across the box near the top thereof from which the lures may be hung by their hooks with a clamping device for holding the lures in position in the notches. Another feature is a spring mounting of the clamping device to permit quick release of the lures when desired.

According to the invention, the holder is in the form of a box deep enough to accommodate the lures hung vertically therein, with a notched bar across the box near the top thereof, the notches receiving one hook of each lure so that the hooks depend from the notches in spaced relation to one another. The lures are held in position by a clamping device which is urged into operative position in which it closes the notches and holds the hooks therein. The box preferably has supports thereon by which the box may be suspended from the gunwale of a boat.

DETAILED DESCRIPTION OF THE PREFERRED EMBODIMENT

Figure 1:
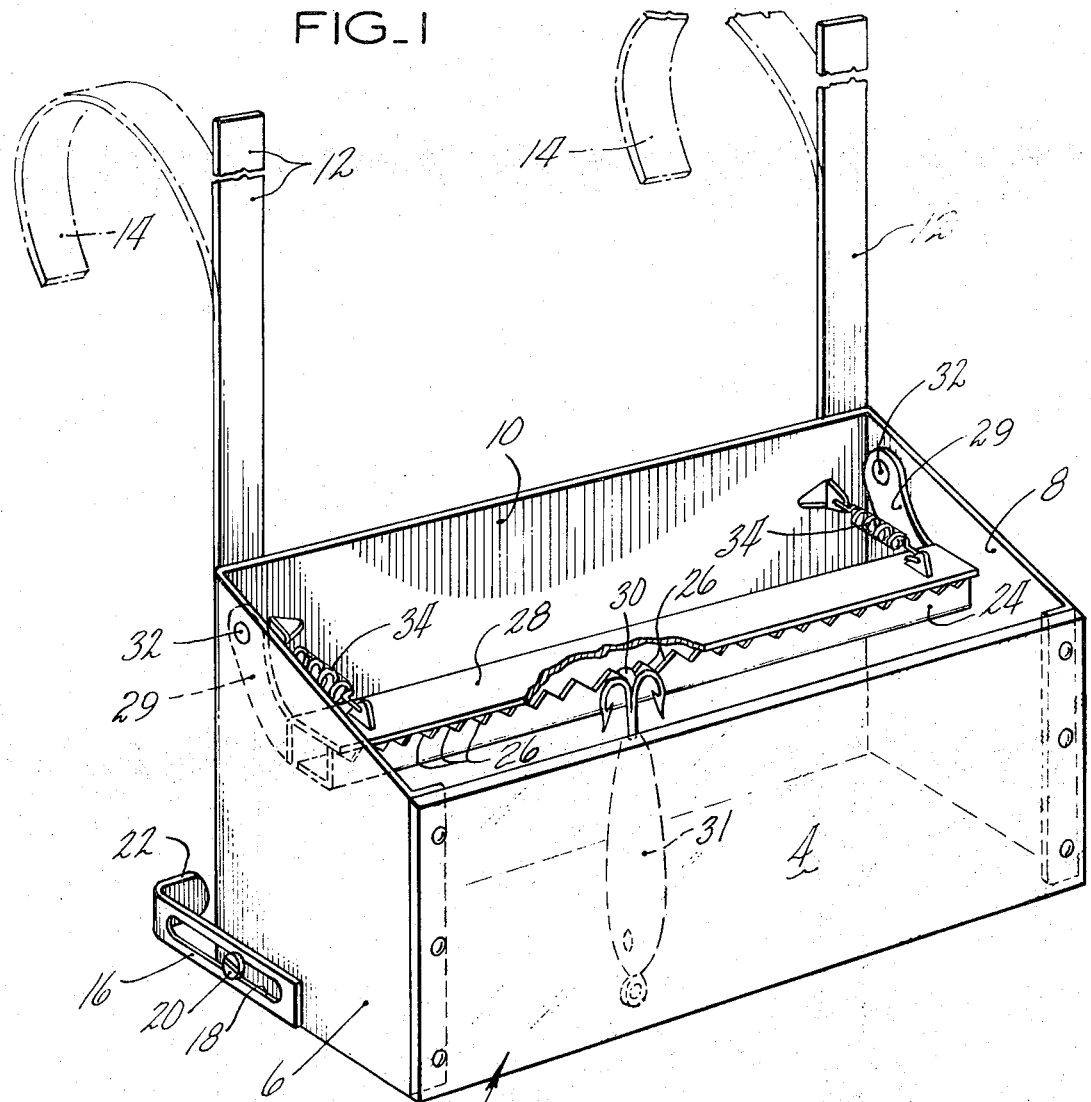
FIG. 1 is a perspective view of the container.

Referring to the drawing, the holder comprises a box 2 having a front wall 4, side walls 6 and 8, and a back wall 10. Extending upwardly from the back wall 10 at opposite ends are supports 12 in the form of metal straps that may be bent where desired to form hooks as shown in dot-dash lines. These hooks may engage over the gunwale of a boat to support the holder in position.

Also to support the box suitably on the boat each side wall has an adjustable bracket 16 adjacent the lower rear corner which may be adjusted horizontally by means of the slot 18 therein and the clamping screw 20. In this way, the rear leg 22 of the bracket may engage the side wall of the boat so that the box will hang vertically.

Within the box is a horizontal bar 24 secured at its opposite ends to the end walls 6 and 8 and having a large number of notches 26 therein from end to end. This bar is located close to the top of the box as shown and is high enough so that a lure 31 hung by one of its hooks 30 fitting in a notch, will depend from the hook and be enclosed within the box. The notches will be so spaced as to accommodate a large number of lures and to support them so that all are readily visible from the top of the box and so that they will not become entangled one with another. The top edges of the side walls are angled upwardly from front to back so that the bar will be supported at a point about level with the top edge of the front wall making access to and visibility of the lures better. The front wall 4 may be a transparent plastic for better visibility.

The notches are closed by a clamping device 28 in the form of a bar overlying the notched bar and having arms 29 at opposite ends hinged as on pins 32 near the upper rear corners of the side walls so that the clamping bar pivots on an axis substantially parallel to the notched bar. The clamping bar is urged into operative position for closing the notches and holding the hooks in position by a spring 34 adjacent each end of the clamping bar. One end of each spring is attached to the bar and the other end of the spring is attached to the rear wall at a point lower than the adjacent pin 32. In this way the spring is toggle-mounted so that when the bar is raised to the inoperative position of FIG. 2, the centerline of the spring will pass the axis of the pivot pins and serve to hold the bar in the inoperative position to permit removal of any one of the lures.

Figure 2:
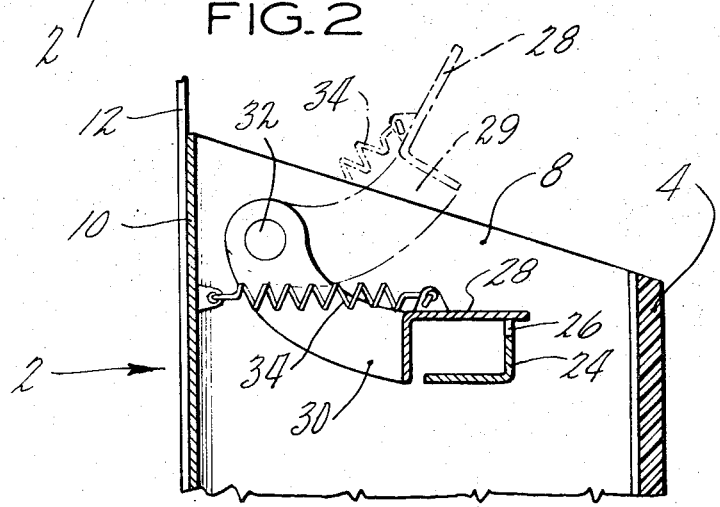
FIG. 2 is a fragmentary sectional view of a detail.

As shown in FIG. 2, the notched bar and the clamping bar are angle shape in cross section and cooperate with one another so that the horizontal flange of the clamping bar rests on the tips of the vertical flange of the support bar. The angle configuration makes possible a lighter weight structure without losing the desired stiffness so that the support bar and clamping bar will function properly.

I claim:

1. A container for fish lures, each lure having at least one hook adjacent one end thereof, said container comprising:
    a box deeper than the length of the lures;
    a notched bar extending horizontally within the box adjacent the top thereof, said lures being hung from said notches by their hooks;
    clamping means pivoted on an axis substantially parallel to and adapted to overlie said notched bar to engage the bar and hold the lures in position; and
    a spring urging said clamping means into operative clamping position, said spring being toggle-mounted to hold the clamping means in either operative or inoperative position.

2. A holder for fish lures, each lure having at least one hook adjacent one end thereof, said holder including:
    a box open at the top to receive the lures;
    a bar extending horizontally across the box adjacent the top with notches therein by which the lures are suspended by their hooks within the box, one hook of each lure engaging a notch;
    supporting bars extending upwardly from the box at opposite ends for hanging the holder from the gunwales of a boat;
    a clamping member extending across the box in parallel relation to said bar to overlie the bar and thereby hold the hooks of the lures in position in the notches, said clamping member being pivotally mounted on an axis substantially parallel to the bar for movement from an inoperative position to an operative clamping position; and
    a toggle-mounted spring acting on the clamping member to hold said member in either operative or inoperative position.

* * * * *